(12) United States Patent
Miller et al.

(10) Patent No.: US 10,871,234 B2
(45) Date of Patent: Dec. 22, 2020

(54) LOW-TORQUE DISC FOR A MULTIPLE ORIFICE VALVE

(71) Applicant: CAMERON INTERNATIONAL CORPORATION, Houston, TX (US)

(72) Inventors: Scott A. Miller, Katy, TX (US); Ghulam A. Barkatally, Spring, TX (US); Jerry A. Martino, Houston, TX (US); Declan Elliott, Newtownforbes (IE); Andrew Twining, Cypress, TX (US)

(73) Assignee: Cameron International Corporation, Houston, TX (US)

( * ) Notice: Subject to any disclaimer, the term of this patent is extended or adjusted under 35 U.S.C. 154(b) by 86 days.

(21) Appl. No.: 16/168,438

(22) Filed: Oct. 23, 2018

(65) Prior Publication Data

US 2020/0124185 A1 Apr. 23, 2020

(51) Int. Cl.
*F16K 3/08* (2006.01)
*F16K 25/00* (2006.01)

(52) U.S. Cl.
CPC ............. *F16K 3/08* (2013.01); *F16K 3/085* (2013.01); *F16K 25/00* (2013.01)

(58) Field of Classification Search
CPC ... F16K 3/08; F16K 3/085; F16K 3/10; F16K 3/06; F16K 3/04; F16K 3/16; F16K 3/188; F16K 25/00; F16K 27/045; Y10T 137/86743; Y10T 137/86718
See application file for complete search history.

(56) References Cited

U.S. PATENT DOCUMENTS

| | | | | |
|---|---|---|---|---|
| 293,240 | A * | 2/1884 | Goldsmith | F16K 3/08 137/625.31 |
| 592,187 | A * | 10/1897 | Berr | F16K 3/08 137/625.31 |
| 3,207,181 | A | 9/1965 | Willis | |
| 3,331,396 | A * | 7/1967 | Elizabeth | F16K 3/08 137/625.31 |
| 3,372,709 | A * | 3/1968 | Dolter | G05D 23/1921 137/625.31 |
| 3,426,797 | A * | 2/1969 | Baker | F16K 3/085 137/625.31 |

(Continued)

FOREIGN PATENT DOCUMENTS

| | | |
|---|---|---|
| JP | 52086835 U | 6/1977 |
| JP | 62183175 U | 11/1987 |

(Continued)

OTHER PUBLICATIONS

PCT International Search Report and Written Opinion; Application No. PCT/US2019/057372; dated Feb. 10, 2020; 12 pages.

*Primary Examiner* — David Colon-Morales
(74) *Attorney, Agent, or Firm* — Fletcher Yoder, P.C.

(57) ABSTRACT

A disc for a multiple orifice valve includes a disc body and a disc orifice extending through the disc body. A disc surface of the disc body includes a recessed portion and a raised portion that at least partially circumferentially surrounds the recessed portion. The recessed portion is configured not to contact an opposed disc when the disc is assembled within a housing of the multiple orifice valve, and the raised portion is configured to contact the opposed disc when the disc is assembled within the housing of the multiple orifice valve.

18 Claims, 7 Drawing Sheets

(56) References Cited

U.S. PATENT DOCUMENTS

| | | | | | |
|---|---|---|---|---|---|
| 3,696,710 | A | * | 10/1972 | Ortelli | F03C 1/0444 91/487 |
| 3,707,169 | A | * | 12/1972 | Friedrichs | F01B 3/0008 137/625.21 |
| 4,098,294 | A | * | 7/1978 | Woods | F15D 1/00 137/614.11 |
| 4,360,040 | A | * | 11/1982 | Cove | F16K 3/34 137/625.3 |
| 4,395,019 | A | * | 7/1983 | Searles | F16K 27/045 251/357 |
| 4,596,377 | A | * | 6/1986 | Taylor | F16K 3/085 251/248 |
| 4,603,834 | A | * | 8/1986 | Hendrick | F16K 3/08 137/625.31 |
| 4,901,977 | A | * | 2/1990 | Hendrick | F16K 31/53 251/249.5 |
| 5,025,832 | A | * | 6/1991 | Taylor | F16K 3/085 137/625.31 |
| 5,025,833 | A | * | 6/1991 | Hendrick | F16K 3/085 137/625.31 |
| 5,054,521 | A | | 10/1991 | Hendrick | |
| 5,063,954 | A | | 11/1991 | Hendrick | |
| 5,088,688 | A | * | 2/1992 | Knapp | F16K 3/08 137/454.5 |
| 5,088,689 | A | * | 2/1992 | Hendricks | F16K 3/085 251/208 |
| 5,217,046 | A | * | 6/1993 | Woods | F16K 3/08 137/614.11 |
| 5,704,588 | A | * | 1/1998 | Korfgen | F16K 3/08 251/208 |
| 9,441,738 | B2 | * | 9/2016 | Herrmann | F16K 3/08 |
| 9,958,074 | B2 | * | 5/2018 | Wan | E21B 34/02 |

FOREIGN PATENT DOCUMENTS

| | | |
|---|---|---|
| JP | 05001077 U | 1/1993 |
| JP | 05001778 A | 1/1993 |

\* cited by examiner

LOW-TORQUE DISC FOR A MULTIPLE ORIFICE VALVE

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Multiple orifice valves are employed to open or close to enable or block a flow of fluid in a variety of applications. Some multiple orifice valves may include a disc with one or more orifices. The disc may rotate within a housing of the multiple orifice valve between a first position in which the one or more orifices are aligned with a flow path to enable the flow of fluid through the multiple orifice valve and a second position in which the one or more orifices are not aligned with the flow path to block the flow of fluid through the multiple orifice valve. However, the torque used to rotate the disc from the second position to the first position may be high, particularly in cases of high differential pressure across the multiple orifice valve.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
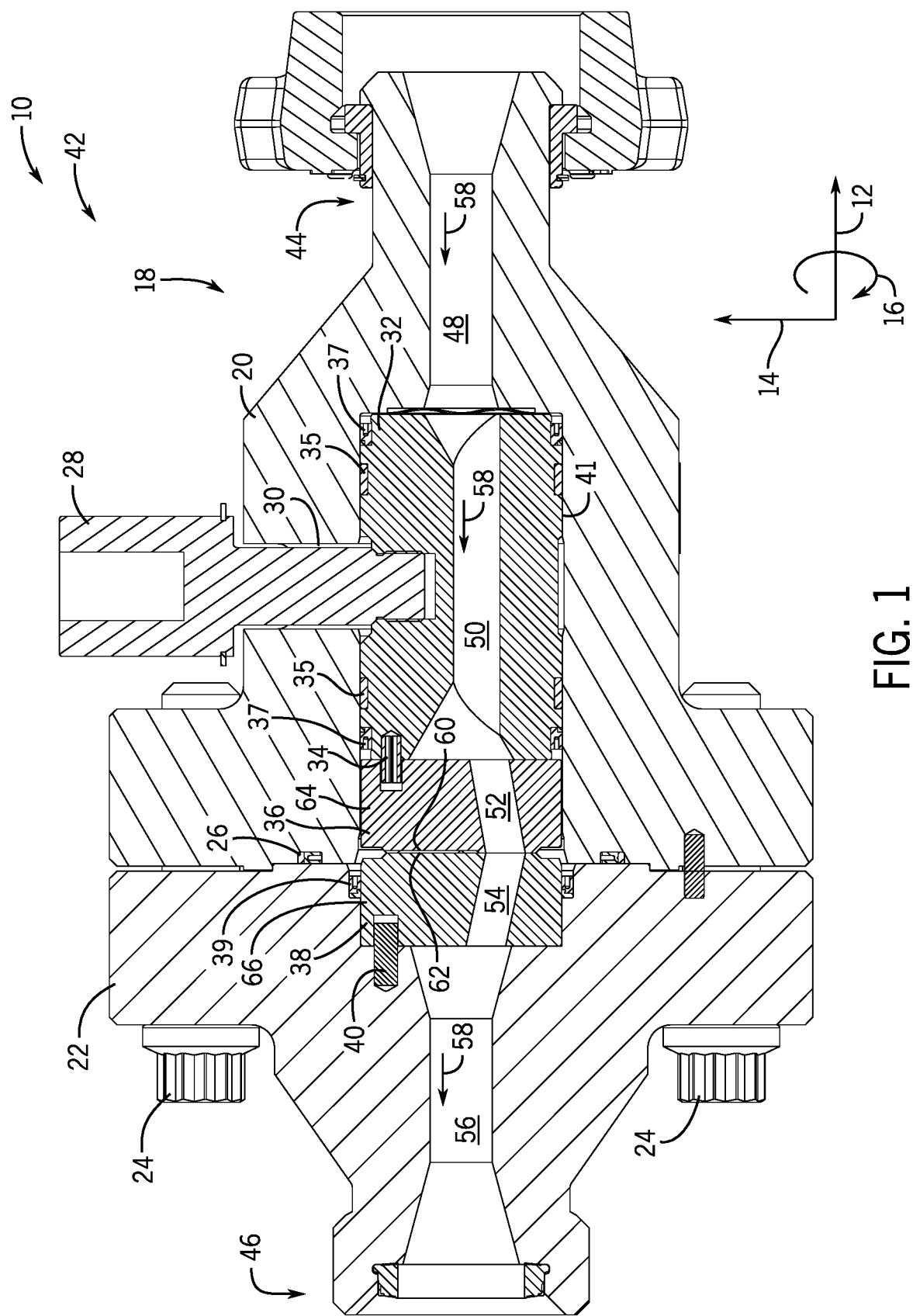
FIG. 1 is a cross-sectional side view of a multiple orifice valve, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosed embodiments relate generally to a multiple orifice valve. The multiple orifice valve may include a first disc and a second disc each having one or more orifices (e.g., through holes). During operation of the multiple orifice valve, the first disc may rotate relative to the second disc. In particular, the first disc may rotate between a first position in which the one or more orifices of the first disc are aligned with the one or more orifices of the second disc to enable a flow of fluid through the multiple orifice valve and a second position in which the one or more orifices of the first disc are not aligned with the one or more orifices of the second disc to block the flow of fluid through the multiple orifice valve. The first disc may rotate to any position located between the first position and the second position (e.g., a position in which the one or more orifices of the first disc are partially aligned or partially overlap with the one or more orifices of the second disc), thereby throttling or adjusting the flow of fluid through the multiple orifice valve. In this way, rotation of the first disc may open and close the multiple orifice valve.

The first disc may include a recessed portion in a surface (e.g., a disc-facing surface that faces the second disc) that results in a reduced contact area between the first disc and the second disc (e.g., as compared to a disc without the recessed portion). The first disc may additionally include one or more channels that enable some of the flow of fluid to reach the recessed portion. Advantageously, these and other features of the disclosed embodiments may reduce the torque used to rotate the first disc relative to the second disc (e.g., to open the multiple orifice valve). Thus, the disclosed embodiments may enable use of generally larger discs (e.g., having larger orifices to support greater flow of fluid) and/or use of the multiple orifice valve in applications with a high differential pressure (e.g., equal to or greater than approximately 50, 75, or 100 Megapascals [MPa]) across the multiple orifice valve.

Turning now to the figures, FIG. 1 is a cross-sectional side view of an embodiment of a multiple orifice valve 10. To facilitate discussion, the multiple orifice valve 10 and its components may be described with reference to an axial axis or direction 12, a radial axis or direction 14, and a circumferential axis or direction 16. As shown, the multiple orifice valve 10 includes a housing 18, which may be formed by a first housing component 20 (e.g., front or upstream body) and a second housing component 22 (e.g., second or downstream body) coupled to one another via one or more fasteners 24 (e.g., threaded fasteners, such as bolts) or some other mechanism (e.g., threaded ends). One or more seals 26 (e.g., annular seals) may be provided at an interface between the first housing component 20 and the second housing component 22.

The multiple orifice valve 10 includes an actuator 28 that extends radially from the housing 18 (e.g., through a slot 30 formed in the first housing component 20). The actuator 28 may be manually actuated (e.g., via an operator) and/or mechanically actuated (e.g., via an electric, hydraulic, or pneumatic actuator). In the illustrated embodiment, the actuator 28 is coupled (e.g., non-rotatably coupled) to a rotator 32 (e.g., annular rotator), which is coupled (e.g., non-rotatably coupled, such as via one or more pins 34) to a first disc 36 (e.g., front disc or upstream disc; low-torque disc). The multiple orifice valve 10 also includes a second disc 38 (e.g., back disc or downstream disc), which is coupled (e.g., non-rotatably coupled, such as via one or more pins 40) to the housing 18 (e.g., to the second housing component 22). Various other features, such as bearings 35, seals 37 (e.g., annular seals), and seals 39 (e.g., annular seals), may be included in the multiple orifice valve 10. As shown, the rotator 32, the first disc 36, the second disc 38 and various other components are positioned within a cavity 41 defined by the housing 18. The first disc 36 may float and move axially within the cavity 41 in response to changes in differential pressure across the first disc 36. The first disc 36 and the second disc 38 may be formed from any suitable material, such as any suitable ceramic or metal (e.g., metal or metal alloy). For example, the first disc 36 and/or the second disc 38 may be formed from tungsten carbide.

In the illustrated embodiment, the multiple orifice valve 10 is in an open position 42 in which a flow path is open from a first end 44 (e.g., upstream end) to a second end 46 (e.g., downstream end) of the multiple orifice valve 10. While the multiple orifice valve 10 is in the open position 42, a fluid may flow along the flow path by flowing into a first channel 48 in the first housing component 20, then through a rotator orifice 50 in the rotator 32, then through a first disc orifice 52 in the first disc 36, then through a second disc orifice 54 in the second disc 38, and/or then into a second channel 56 in the second housing component 22, as shown by arrows 58. While the orifices 52, 54 are illustrated as having a circular cross-sectional shape, it should be appreciated that the first disc 36 and/or the second disc 38 may have any number of orifices 52, 54 having any of a variety of cross-sectional shapes (e.g., rectangular, triangular, half-moon, or some irregular cross-sectional shape).

When the multiple orifice valve 10 is in the open position 42, the first disc 36 is in a first position in which the first disc orifice 52 of the first disc 36 is aligned with and in fluid communication with the second disc orifice 54 of the second disc 38. As discussed above, the multiple orifice valve 10 may be moved between the open position 42 in which the flow of fluid is enabled across the multiple orifice valve 10, a closed position in which the flow of fluid is blocked across the multiple orifice valve 10, or any position therebetween. To reach the closed position, the actuator 28 may be moved in the circumferential direction 16 (e.g., within the slot 30, which extends radially through the housing 18 and circumferentially about a portion of the housing 18) to thereby rotate the rotator 32 and the first disc 36 relative to the housing 18 and relative to the second disc 38. The multiple orifice valve 10 is in the closed position when the first disc 36 is in a second position in which the first disc orifice 52 of the first disc 36 is not aligned with or in fluid communication with the second disc orifice 54 of the second disc 38. Thus, the multiple orifice valve 10 may be adjusted between the illustrated open position 42 and the closed position via movement of the actuator 28 to adjust the alignment between the first disc orifice 52 of the first disc 36 and the second disc orifice 54 of the second disc 38. To move between the first position and the second position, the first disc 36 may be rotated by approximately 30, 45, 60, 75, 90 or more degrees, or the first disc 36 may be rotated between approximately 30 to 180 or 45 to 90 degrees.

As shown, a surface 60 (e.g., first disc surface; disc-facing surface) of the first disc 36 faces a surface 62 (e.g., second disc surface; disc-facing surface) of the second disc 38. When the first disc 36 and the second disc 38 are assembled within the multiple orifice valve 10, the surface 60 is on a downstream side of a body 64 (e.g., a first disc body) of the first disc 36 and the surface 62 is on an upstream side of a body 66 (e.g., a second disc body) of the second disc 38. As discussed in more detail below, a portion of the surface 60 of the first disc 36 contacts and seals (e.g., a metal-to-metal seal) against the surface 62 of the second disc 38 at least while the multiple orifice valve 10 is in the closed position. Additionally, a recessed portion may be formed in the surface 60 of the first disc 36 to reduce a contact area between the first disc 36 and the second disc 38. Furthermore, one or more channels may be provided to enable some of the flow of fluid to reach the recessed portion. Such a configuration may reduce a torque used to rotate the first disc 36 from the second position to the first position to move the multiple orifice valve 10 from the closed position to the open position 42. Thus, the disclosed embodiments may be particularly useful with large multiple orifice valves 10 (e.g., having large discs 36, 38) and/or in high differential pressure applications (e.g., an upstream pressure, such as in the first channel 48, is much greater than a downstream pressure, such as in the second channel 56).

Figure 2:
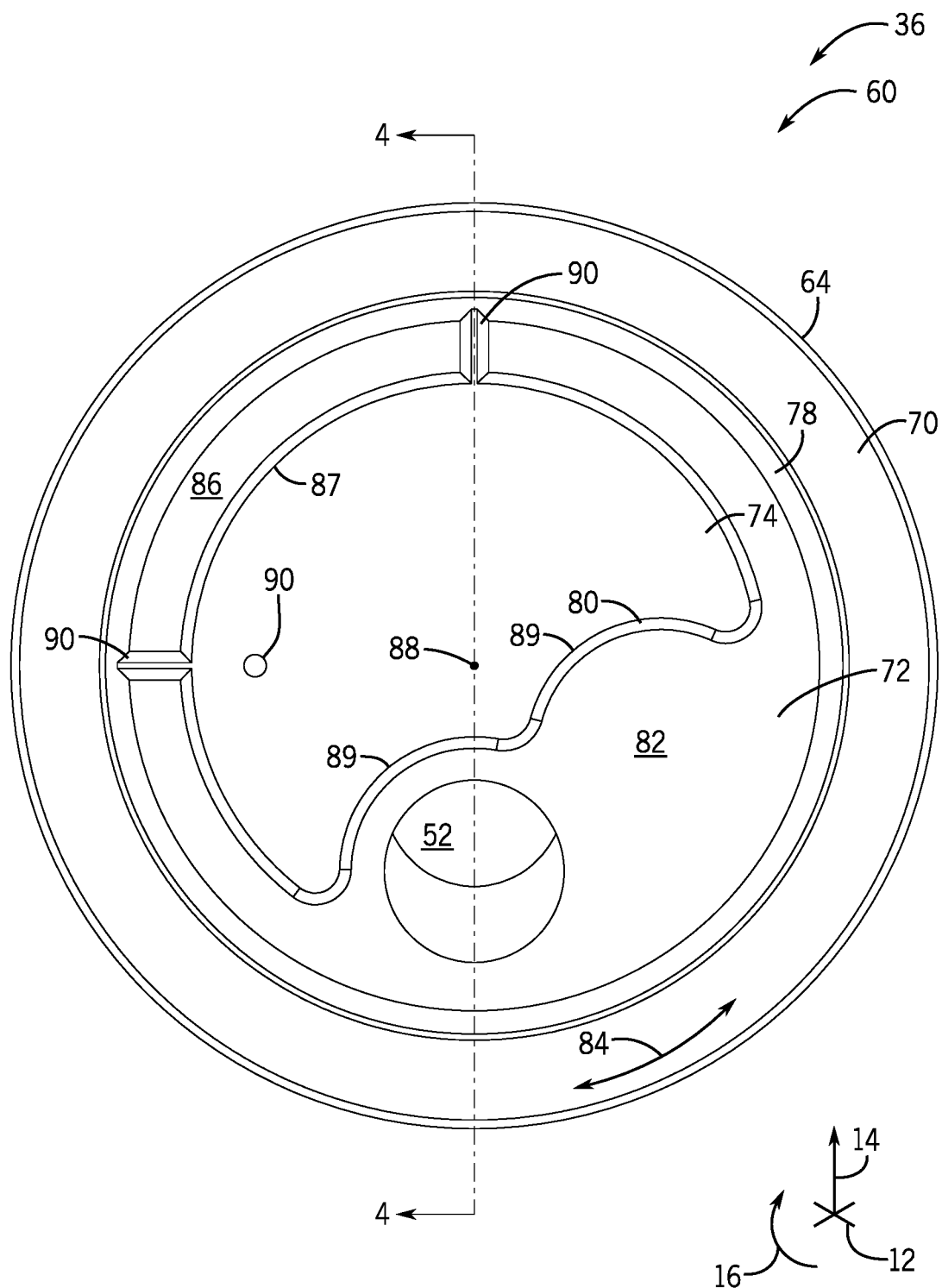
FIG. 2 is a front view of a first disc that may be used in the multiple orifice valve of FIG. 1, in accordance with an embodiment of the present disclosure.

FIG. 2 is a front view of an embodiment of the first disc 36 that may be used in the multiple orifice valve 10. It should be appreciated that the surface 60 shown in the front view of FIG. 2 may be positioned on a downstream side of the body 64 of the first disc 36 when the first disc 36 is assembled within the multiple orifice valve 10 (e.g., as shown in FIG. 1). The surface 60 includes various recessed and protruding portions. As shown, the surface 60 includes an outer portion 70 (e.g., annular portion), a raised portion 72 (e.g., annular or partially-annular portion), and a recessed portion 74 (e.g., a recess). The outer portion 70, the raised portion 72, and the recessed portion 74 may be flat, tapered, or curved surfaces. For example, the outer portion 70 may be a flat surface extending in a plane at a first location along the axial axis 12, the raised portion 72 may be a flat surface extending in a plane at a second location along the axial axis 12, and the recessed portion 74 may be a flat surface extending in a plane at the first location or a third location along the axial axis 12. When the first disc 36 is assembled within the multiple orifice valve 10, the raised portion 72 of the first disc 36 may extend axially toward and contact the surface 62 of the second disc 38 (FIG. 1), while the outer portion 70 and the recessed portion 74 are positioned further away from the surface 62 of the second disc 38 and do not contact the surface 62 of the second disc 38. It should be appreciated that the outer portion 70 is optional, and thus, the surface 60 of the first disc 36 may only include the raised portion 72 and the recessed portion 74.

The first disc 36 may include a first tapered portion 78 (e.g., annular or partially-annular tapered portion) between the outer portion 70 and the raised portion 72 and/or a second tapered portion 80 (e.g., annular or partially-annular tapered portion) between the raised portion 72 and the recessed portion 74. As noted above, the outer portion 70 is optional, and thus, the first tapered portion 78 or the raised portion 74 may form a radially-outer edge of the surface 60 of the first disc 36. As shown, the raised portion 72 may circumferentially surround the first disc orifice 52, thereby facilitating flow from the first disc orifice 52 to the second disc orifice 54 while the multiple orifice valve 10 is in the open position 42 (FIG. 1). Furthermore, the raised portion 72 may include an area 82 (e.g., orifice-sealing area) that is aligned with the second disc orifice 54 when the multiple orifice valve 10 is in the closed position. The area 82 may enable the first disc 36 to form a seal (e.g., metal-to-metal seal) against the surface 62 of the second disc 38, and the seal may circumferentially surround the second disc orifice 54 to block the flow of fluid into the second disc orifice 54 (e.g., to block the flow of fluid across the multiple orifice valve 10) when the multiple orifice valve 10 is in the closed position. The area 82 of the first disc 36 and the portion of the surface 62 of the second disc 38 contacted by the area 82 of the first disc 36 may be flat, polished surfaces to facilitate sealing. In this way, the first disc 36 and the second disc 38 may form a reliable seal to block the flow of fluid across the multiple orifice valve 10 while the multiple orifice valve 10 is in the closed position. As discussed above with respect to FIG. 1, the multiple orifice valve 10 may be adjusted between the closed position and the open position 42 by rotating the first disc 36, as shown by arrows 84.

The raised portion 72 may include another area 86 that is generally diametrically opposed to the first disc orifice 52 and/or the area 82. The area 86 may balance the first disc 36 and/or block the first disc 36 from tilting relative to the second disc 38 (e.g., a center axis 88 of the first disc 36 may remain generally aligned with the axial axis 12 of the multiple orifice valve 10) when the first disc 36 is assembled within the multiple orifice valve 10. In the illustrated embodiment, the raised portion 72 at least partially circumferentially surrounds the recessed portion 74.

The recessed portion 74 may have any of a variety of shapes. In the illustrated embodiment, the recessed portion 74 includes a semi-circular or half-moon shape. More particularly, the recessed portion 74 includes a curved wall 87 that defines a semi-circular edge (e.g., an arc extending at least 180 degrees) and additional curved walls 89 that correspond to a contour of the first disc orifice 52 and the second disc orifice 54, which will be positioned at the area 82 when the multiple orifice valve 10 is in the closed position. As shown, the recessed portion 74 may extend across a center (e.g., the center axis 88) of the first disc 36, and may cover at least about 10, 20, 30, 40, or 50 percent of a surface area of the surface 60 of the first disc 36. The recessed portion 74 may have a depth (e.g., along the axial axis 12 and relative to the raised portion 72) of greater than or approximately equal to 0.5, 1, 2, 3, 4, 5, or more millimeters. The recessed portion 74 may reduce a contact area between the surface 60 of the first disc 36 and the surface 62 of the second disc 38 during operation of the multiple orifice valve 10 (e.g., as compared to a disc without the recessed portion 74), which may create a pressure balancing effect (e.g., by reducing the contact area reacting to upstream pressure) and reduce the torque used to adjust the multiple orifice valve 10 from the closed position to the open position 42.

In some embodiments, it may be advantageous to enable fluid entry into the recessed portion 74 to further reduce friction the between the surface 60 of the first disc 36 and the surface 62 of the second disc 38 and/or to balance the pressure across the first disc 36 during operation of the multiple orifice valve 10. For example, one or more channels 90 may extend radially across the raised portion 72 to enable fluid entry into the recessed portion 74. It should be appreciated that any suitable number (e.g., 1, 2, 3, 4, 5, or more) of channels 90 having any suitable dimensions may be positioned at any location of the first disc 36 to facilitate fluid entry into the recessed portion 74. With reference to FIGS. 1 and 2, due at least in part to the absence of seals between the rotator 32 and the first disc 36 and the absence of seals between the first disc 36 and the housing 18, the fluid flowing along the flow path of the multiple orifice valve 10 may flow into the recessed portion 74 via the one or more channels 90. In particular, the fluid from the rotator orifice 50 may flow radially outwardly between the rotator 32 and the first disc 36, around the first disc 36 to the surface 60 of the first disc 36, and then into the recessed portion 74 via the one or more channels 90. As noted above, the raised portion 72 may at least partially circumferentially surround the recessed portion 74, which may include an embodiment in which the raised portion 72 forms a substantially continuous ring (e.g., a segmented ring) around the recessed portion 74 with only the one or more channels 90 breaking or interrupting the substantially continuous ring around the recessed portion 74. Additionally or alternatively, one or more channels 90 (e.g., 1, 2, 3, 4, 5 or more) may be through holes that extend axially across the first disc 36 to fluidly couple the rotator orifice 50 to the recessed portion 74.

Figure 3:
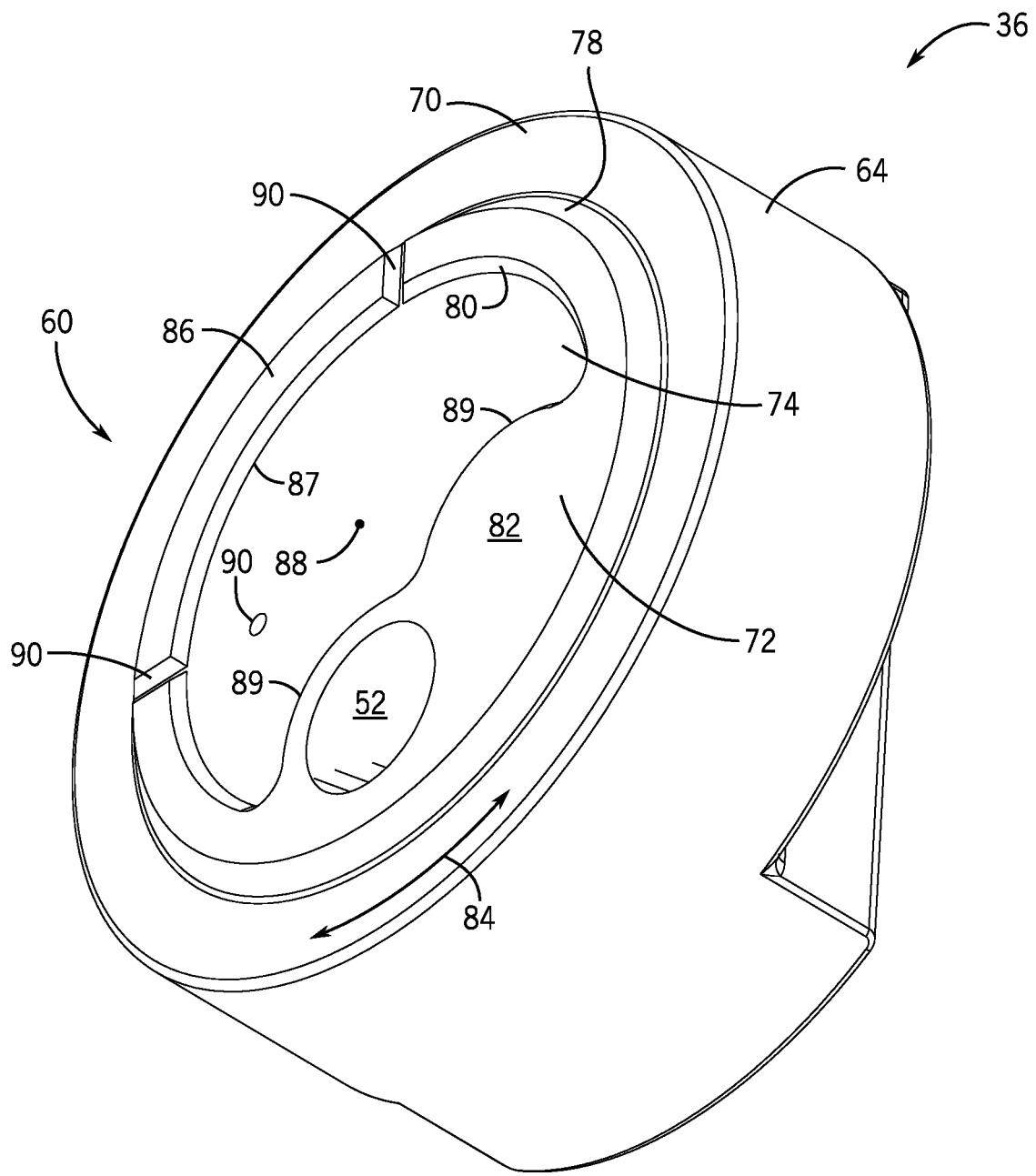
FIG. 3 is a front perspective view of the first disc of FIG. 2, in accordance with an embodiment of the present disclosure.
Figure 3:
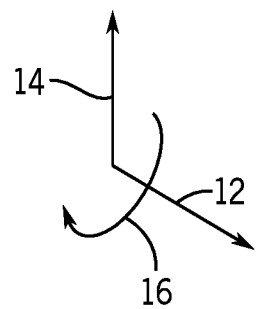
Figure 4:
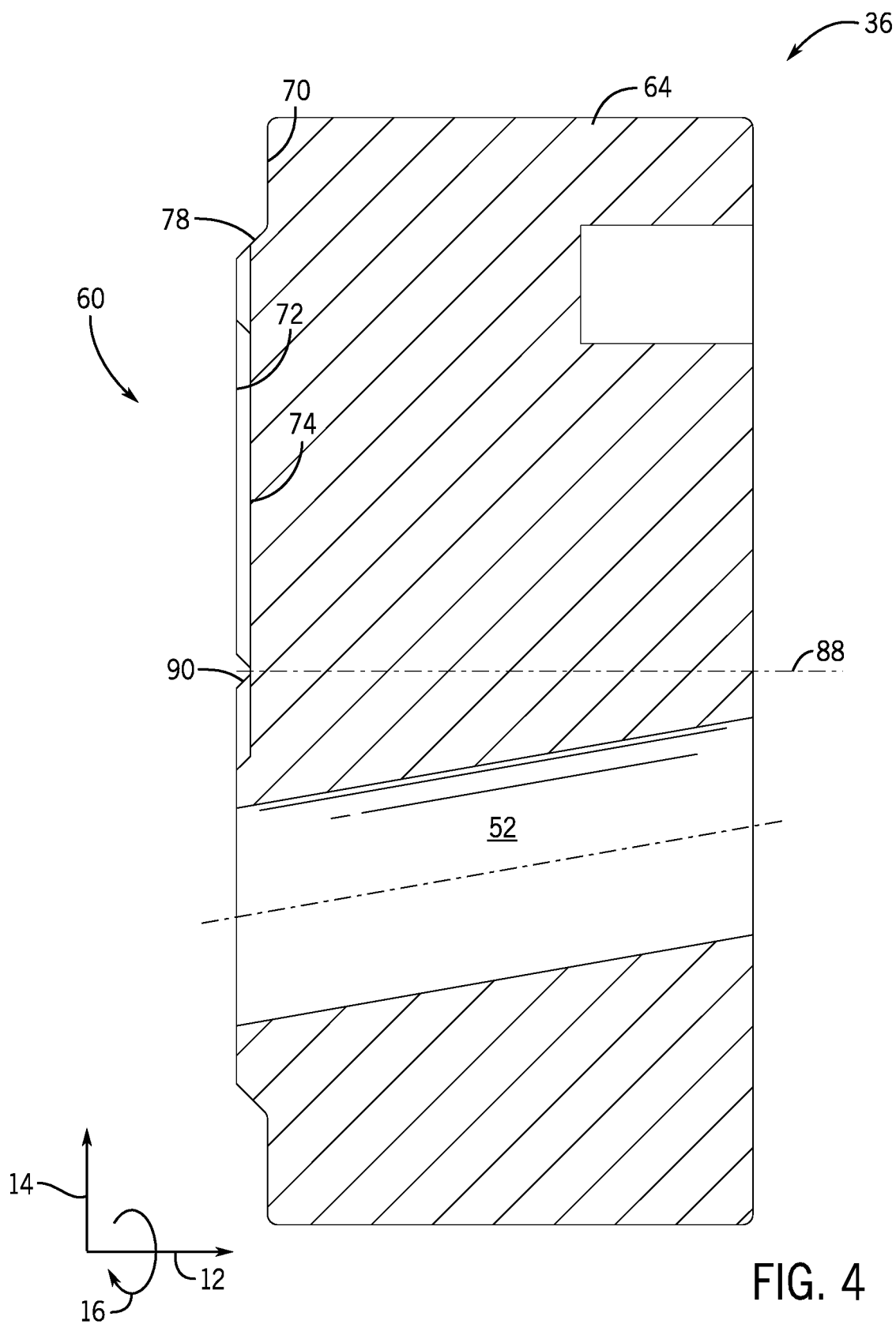
FIG. 4 is a cross-sectional side view of the first disc of FIG. 2, in accordance with an embodiment of the present disclosure.

FIG. 3 is a front perspective view of an embodiment of the first disc 36 and FIG. 4 is a cross-sectional side view of an embodiment of the first disc 36 taken within line 4-4 of FIG. 2. FIGS. 3 and 4 are merely provided to facilitate understanding of the various features of the first disc 36, and the reference numbers in FIGS. 3 and 4 refer to the same parts described above with reference to FIG. 2.

Figure 5:
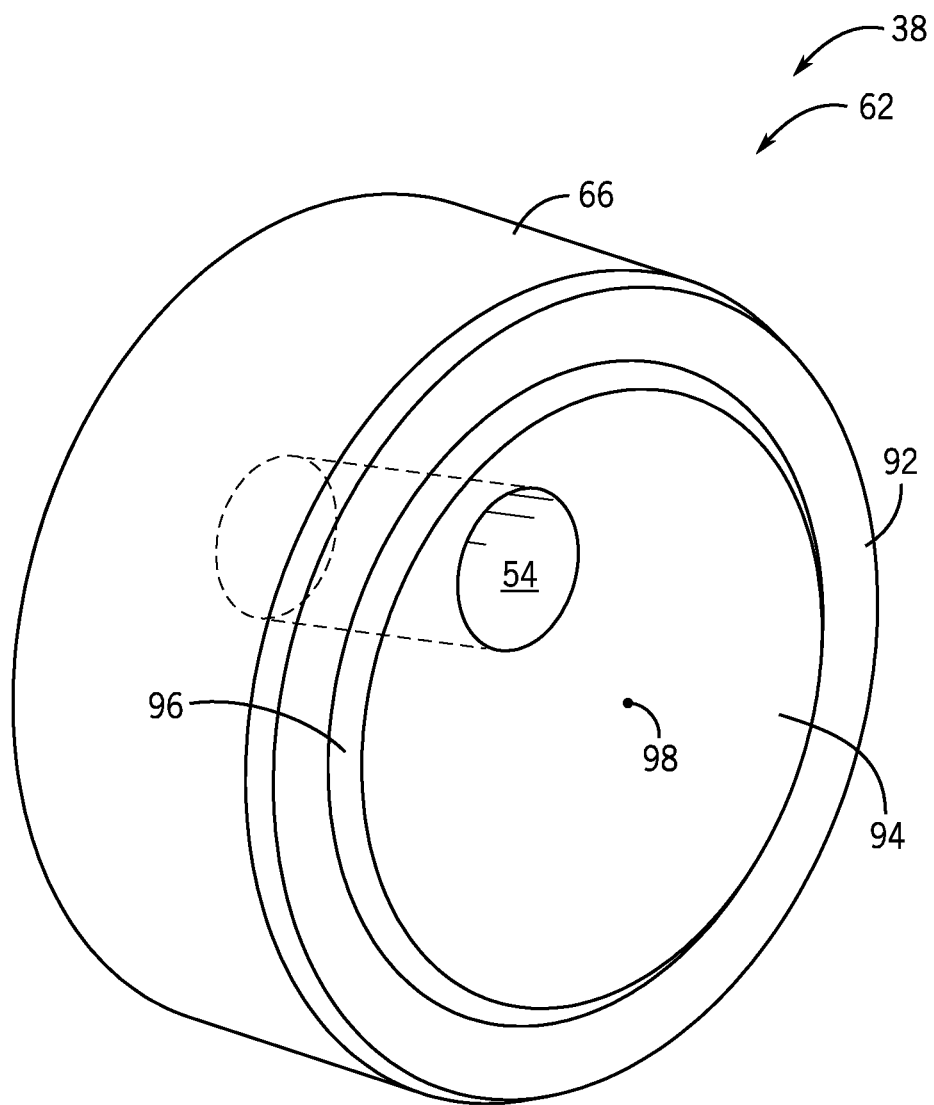
FIG. 5 is a front view of a second disc that may be used in the multiple orifice valve of FIG. 1, in accordance with an embodiment of the present disclosure.
Figure 5:
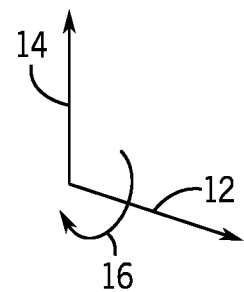

FIG. 5 is a front view of an embodiment of the second disc 38 that may be used in the multiple orifice valve 10. It should be appreciated that the surface 62 shown in the front view of FIG. 3 may be positioned on an upstream side of the body 66 of the second disc 38 when the second disc 38 is assembled within the multiple orifice valve 10 (e.g., as shown in FIG. 1). In the illustrated embodiment, the surface 62 includes an outer portion 92 (e.g., annular portion) and a raised portion 94. The outer portion 92 may be a flat surface extending in a plane at a first location along the axial axis 12, and the raised portion 94 may be a flat surface extending in a plane at a second location along the axial axis 12. The outer portion 92 circumferentially surrounds the raised portion 94, which may have a circular shape. As shown, a tapered portion 96 (e.g., annular tapered portion) is positioned between the outer portion 92 and the raised portion 94. When the second disc 38 is assembled within the multiple orifice valve 10, the raised portion 94 of the surface 62 of the second disc 38 may extend axially toward and contact the raised portion 72 of the surface 60 of the first disc 36 (FIGS. 1-4), while the outer portion 92 is positioned further away from the surface 60 of the first disc 36 and does not contact the surface 60 of the first disc 36. It should be appreciated that the outer portion 92 is optional, and thus, the surface 62 of the second disc 38 may only include the raised portion 94 (e.g., a single flat surface).

As shown, the raised portion 94 may extend across a center (e.g., the center axis 98) of the second disc 38, and may cover at least approximately 50, 60, 70, 80, or 90 percent of a surface area of the surface 62 of the second disc 38. The raised portion 94 may circumferentially surround the second disc orifice 54, thereby facilitating contact between the raised portion 94 of the surface 62 of the second disc 38 and the raised portion 72 of the surface 60 of the first disc 36 while the multiple orifice valve 10 is in the open position 42 (FIG. 1) and the closed position. For example, the raised portion 94 of the second disc 38 and the area 82 of the raised portion 72 of the first disc 36 may form a seal (e.g., metal-to-metal seal) to block the flow of fluid into the second disc orifice 54 (e.g., to block the flow of fluid across the multiple orifice valve 10) when the multiple orifice valve 10 is in the closed position.

Figure 6:
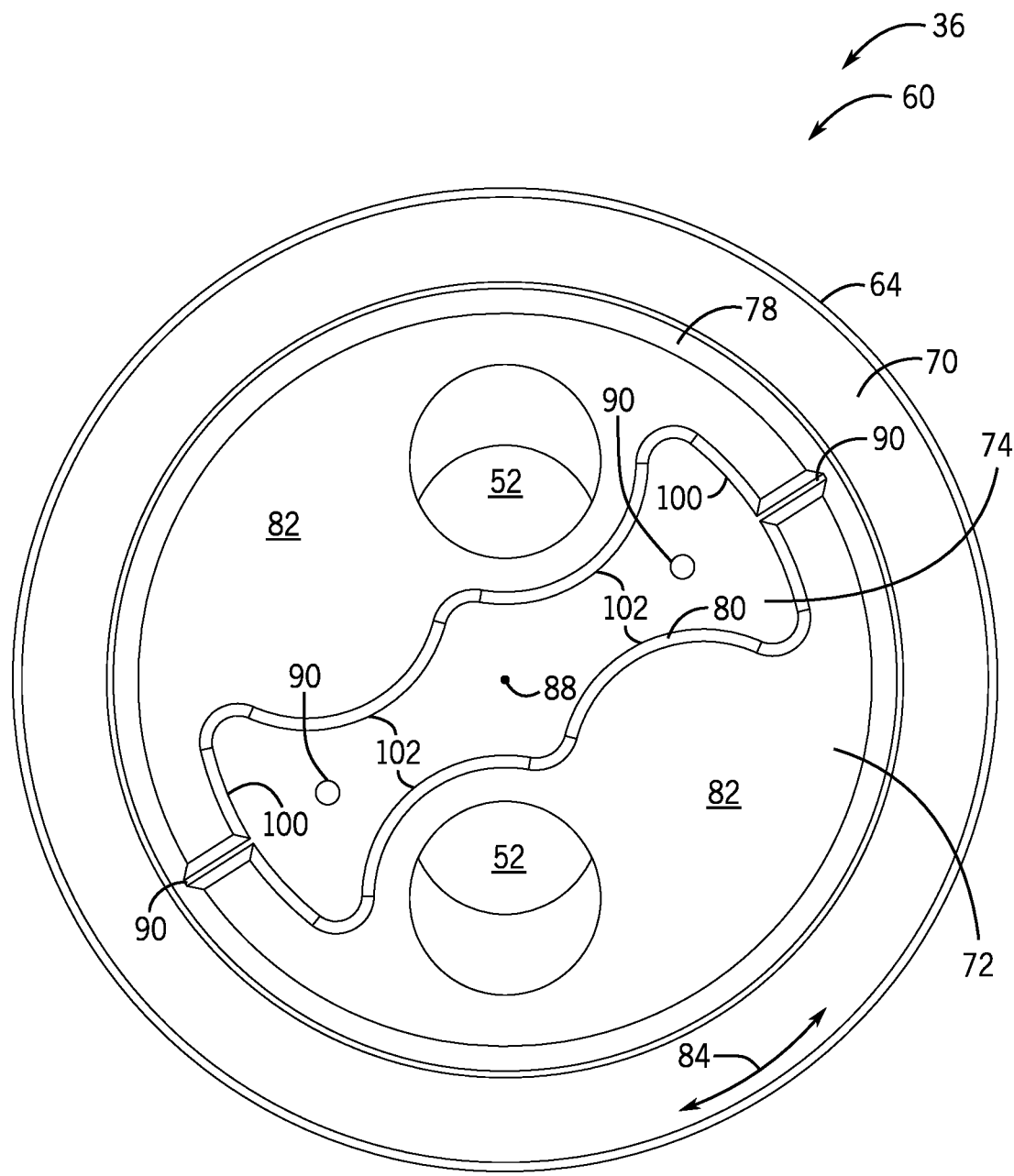
FIG. 6 is a front view of a first disc having multiple orifices that may be used in the multiple orifice valve of FIG. 1, in accordance with an embodiment of the present disclosure.
Figure 6:
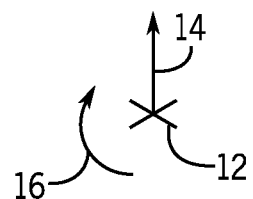

FIG. 6 is a front view of the first disc 36 having multiple first disc orifices 52. It should be appreciated that the surface 60 shown in the front view of FIG. 4 may be positioned on a downstream side of the body 64 of the first disc 36 when the first disc 36 is assembled within the multiple orifice valve 10 (e.g., as shown in FIG. 1). Furthermore, while the first disc 36 shown in FIG. 6 includes two first disc orifices 52, it should be appreciated that the various features disclosed herein (e.g., the raised portion 72, the recessed portion 74, the one or more channels 90) may be modified for use with the first disc 36 having any number (e.g., 1, 2, 3, 4, or more) of first disc orifices 52.

As shown, the surface 60 includes various recessed and protruding portions. For example, the surface 60 may include the outer portion 70, the raised portion 72, the recessed portion 74, the first tapered portion 78, and/or the second tapered portion 80. The raised portion 72 may circumferentially surround each of the first disc orifices 52, thereby facilitating flow from the first disc orifice 52 to the second disc orifice 54 while the multiple orifice valve 10 is in the open position 42 (FIG. 1). Furthermore, the raised portion 72 may include the areas 82 (e.g., orifice-sealing areas) that are aligned with corresponding second disc orifices 54 when the multiple orifice valve 10 is in the closed position. The areas 82 may enable the first disc 36 to form a seal (e.g., metal-to-metal seal) against the surface 62 of the second disc 38, and the seal may circumferentially surround the second disc orifices 54 to block the flow of fluid into the second disc orifices 54 (e.g., to block the flow of fluid across the multiple orifice valve 10) when the multiple orifice valve 10 is in the closed position. Furthermore, because the areas 82 are generally diametrically opposed to one another, the areas 82 may balance the first disc 36 and/or block the first disc 36 from tilting relative to the second disc 38 (e.g., the center axis 88 of the first disc 36 may remain generally aligned with the axial axis 12 of the multiple orifice valve 10) when the first disc 36 is assembled within the multiple orifice valve 10. The multiple orifice valve 10 may be adjusted between the closed position and the open position 42 by rotating the first disc 36, as shown by arrows 84.

The recessed portion 74 may have any of a variety of shapes. In the illustrated embodiment, the recessed portion 74 includes a generally elongated shaped that extends across a center (e.g., the center axis 88) of the first disc 36. The recessed portion 74 includes outer curved walls 100 and additional curved walls 102 that correspond to a contour of the first disc orifices 52 and the second disc orifices 54, which will be positioned at the areas 82 when the multiple orifice valve 10 is in the closed position. The recessed portion 74 may cover at least about 10, 20, 30, 40, or 50 percent of a surface area of the surface 60 of the first disc 36. The recessed portion 74 may reduce a contact area between the surface 60 of the first disc 36 and the surface 62 of the second disc 38 during operation of the multiple orifice valve 10 (e.g., as compared to a disc without the recessed portion 74), which may reduce the torque used to adjust the multiple orifice valve 10 between the closed position and the open position 42.

As discussed above, it may be advantageous to enable fluid entry into the recessed portion 74 to further reduce friction between the between the surface 60 of the first disc 36 and the surface 62 of the second disc 38 and/or to balance pressure across the first disc 36 during operation of the multiple orifice valve 10. Thus, one or more channels 90 may extend radially across the raised portion 72 to enable fluid entry into the recessed portion 74. As noted above, additionally or alternatively, one or more channels 90 may extend axially through the first disc 36 to enable fluid entry into the recessed portion 74. It should be appreciated that any suitable number (e.g., 1, 2, 3, 4, 5, or more) of channels 90 having any suitable dimensions may be positioned at any location of the first disc 36 to facilitate fluid entry into the recessed portion 74 in the manner discussed above with reference to FIGS. 1 and 2.

The features disclosed above with respect to FIGS. 1-6 may be incorporated into various other types of multiple orifice valves. For example, an angle body valve 110 may include a first disc 112 and a second disc 114. The first disc 112 may have any of the configurations and features of the first disc 36 shown and described with respect to FIGS. 1-6, and the second disc 114 may have any of the features of the second disc 38 shown and described with respect to FIGS. 1-6. For example, the first disc 112 may include the recessed portion 74 and the one or more channels 90 shown and described with respect to FIGS. 1-6.

As shown, the angle body valve 110 includes a turning fork 116 (e.g., rod) that is non-rotatably coupled to the first disc 112. Thus, actuation and rotation of the turning fork 116 causes rotation of the first disc 112 and causes the first disc 112 to move relative to the second disc 114. More particularly, rotation of the turning fork 116 causes the first disc 112 to rotate from the illustrated open position in which orifices of the first disc 112 and the second disc 114 are aligned to enable fluid flow through the angle body valve 110 and a closed positioned in which the orifices of the first disc 112 and the second disc 114 are not aligned to block fluid flow through the angle body valve 110. As noted above, the angle body valve 110 is merely one alternative type of valve that may include the low torque disc disclosed herein.

Figure 7:
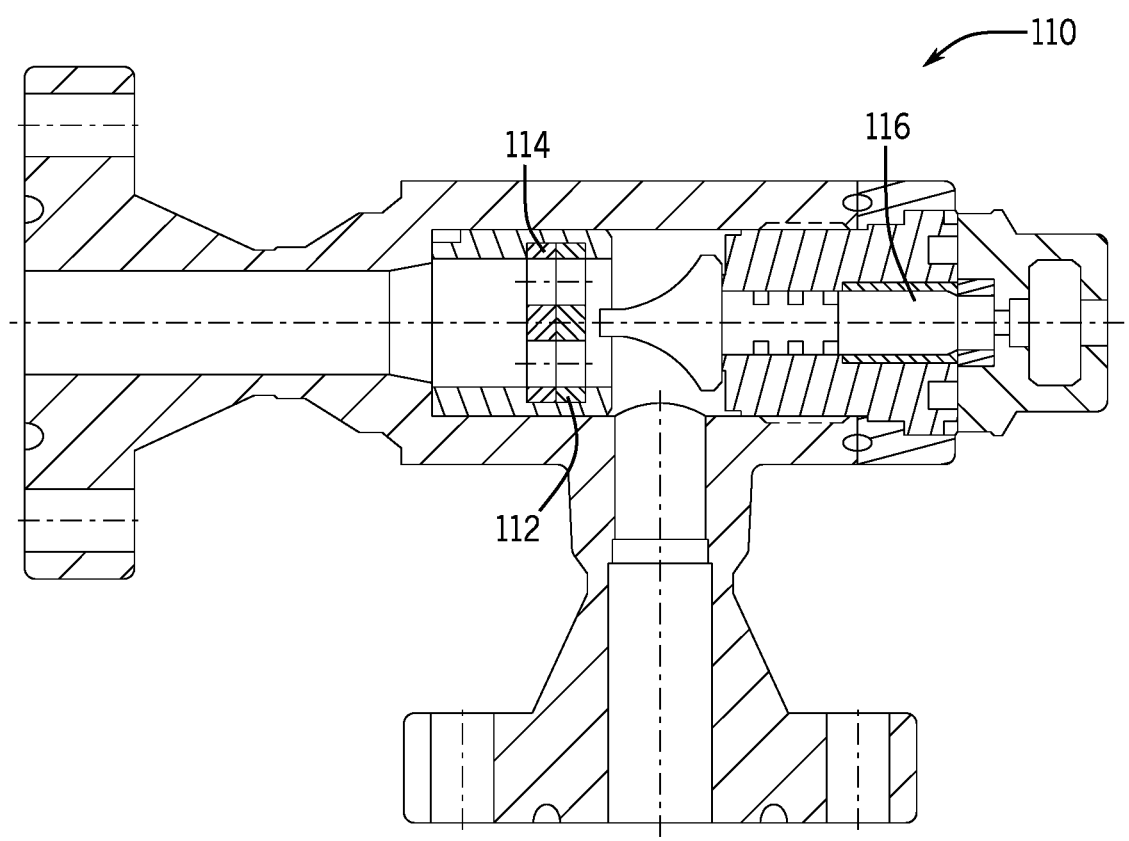
FIG. 7 is a cross-sectional side view of an angle body valve, in accordance with an embodiment of the present disclosure.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims. For example, it should be appreciated that the first disc 36, 112 may be positioned downstream of the second disc 38, 114 (e.g., at the location of the second disc 38 in FIG. 1 or the second disc 114 of FIG. 7), and the second disc 38, 114 may be positioned upstream of the first disc 36, 112 (e.g., at the location of the first disc 36 in FIG. 1 or the first disc 112 of FIG. 7). Thus, the first disc 36, 112 having the raised portion 72, the recessed portion 74, and/or the one or more channels 90 may be positioned downstream of the second disc 38, 114 (e.g., at the location of the second disc 38 in FIG. 1 or the second disc 114 of FIG. 7).

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A disc for a multiple orifice valve, comprising:
   a disc body;
   a disc orifice extending through the disc body; and
   a disc surface of the disc body comprising a recessed portion and a raised portion that at least partially circumferentially surrounds the recessed portion, wherein the recessed portion extends across a center of the disc surface and is configured not to contact an opposed disc when the disc is assembled within a housing of the multiple orifice valve, and the raised portion is configured to contact the opposed disc when the disc is assembled within the housing of the multiple orifice valve.

2. The disc of claim 1, wherein the raised portion circumferentially surrounds the disc orifice.

3. The disc of claim 1, wherein the raised portion comprises an area that is configured to align with a respective disc orifice of the opposed disc when the multiple orifice valve is in a closed position.

4. The disc of claim 1, wherein the disc surface comprises one or more channels extending radially across the raised portion or axially through the disc to enable a flow of fluid into the recessed portion.

5. The disc of claim 1, wherein the recessed portion comprises a curved wall that defines a semi-circular edge.

6. The disc of claim 1, comprising an additional orifice extending through the disc body, wherein the raised portion circumferentially surrounds the disc orifice and the additional orifice.

7. A multiple orifice valve, comprising:
   a housing;
   a first disc positioned within a cavity of the housing and comprising a first disc orifice; and
   a second disc positioned within the cavity of the housing and comprising a second disc orifice;
   wherein a surface of the first disc comprises a recessed portion that extends across a center of the surface and is configured not to contact the second disc while the multiple orifice valve is in an open position and while the multiple orifice valve is in a closed position, and the surface of the first disc comprises a raised portion that is configured to contact and to seal against the second disc at least while the multiple orifice valve is in the closed position.

8. The multiple orifice valve of claim 7, wherein the raised portion circumferentially surrounds the first disc orifice.

9. The multiple orifice valve of claim 7, wherein the raised portion comprises an area that is configured to align with the second disc orifice of the second disc when the multiple orifice valve is in the closed position.

10. The multiple orifice valve of claim 7, wherein the raised portion at least partially circumferentially surrounds the recessed portion.

11. The multiple orifice valve of claim 7, comprising one or more channels extending radially across the raised portion or axially through the disc to enable a flow of fluid into the recessed portion.

12. The multiple orifice valve of claim 7, wherein the recessed portion comprises a curved wall that defines a semi-circular edge.

13. The multiple orifice valve of claim 7, wherein the first disc comprises an additional first disc orifice, wherein the raised portion circumferentially surrounds the first disc orifice and the additional first disc orifice.

14. The multiple orifice valve of claim 7, wherein the second disc comprises a raised surface that circumferentially surrounds the second disc orifice.

15. The multiple orifice valve of claim 7, comprising:
   an actuator; and
   an annular rotator non-rotatably coupled to the actuator and non-rotatably coupled to the first disc;
   wherein actuation of the actuator causes rotation of the annular rotator and the first disc relative to the second disc and the housing to adjust the multiple orifice valve between the open position and the closed position.

16. The multiple orifice valve of claim 7, wherein the first disc is positioned upstream of the second disc relative to a flow of fluid through the multiple orifice valve.

17. A disc for a multiple orifice valve, comprising:
   a disc body;
   a disc orifice extending through the disc body; and
   a disc surface of the disc body comprising a recessed portion, a raised portion, and one or more radially-extending channels;
   wherein the recessed portion extends across a center of the disc body and is configured not to contact an opposed disc when assembled within a housing of the multiple orifice valve, the raised portion at least partially circumferentially surrounds the recessed portion and circumferentially surrounds the disc orifice, the raised portion is configured to contact the opposed disc when assembled within the housing of the multiple orifice valve, and the one or more radially-extending channels are configured to enable a flow of fluid across the raised portion to the recessed portion.

18. The disc of claim 17, wherein the one or more radially-extending channels comprise at least two radially-extending channels.

* * * * *